T. H. BAILEY, dec'd.,
B. WALLACE, Administratrix, C. E. BLAKE, Assignee.
RELIEF VALVES FOR WATER-CYLINDER.
No. 7,886. Reissued Sept. 18, 1877.
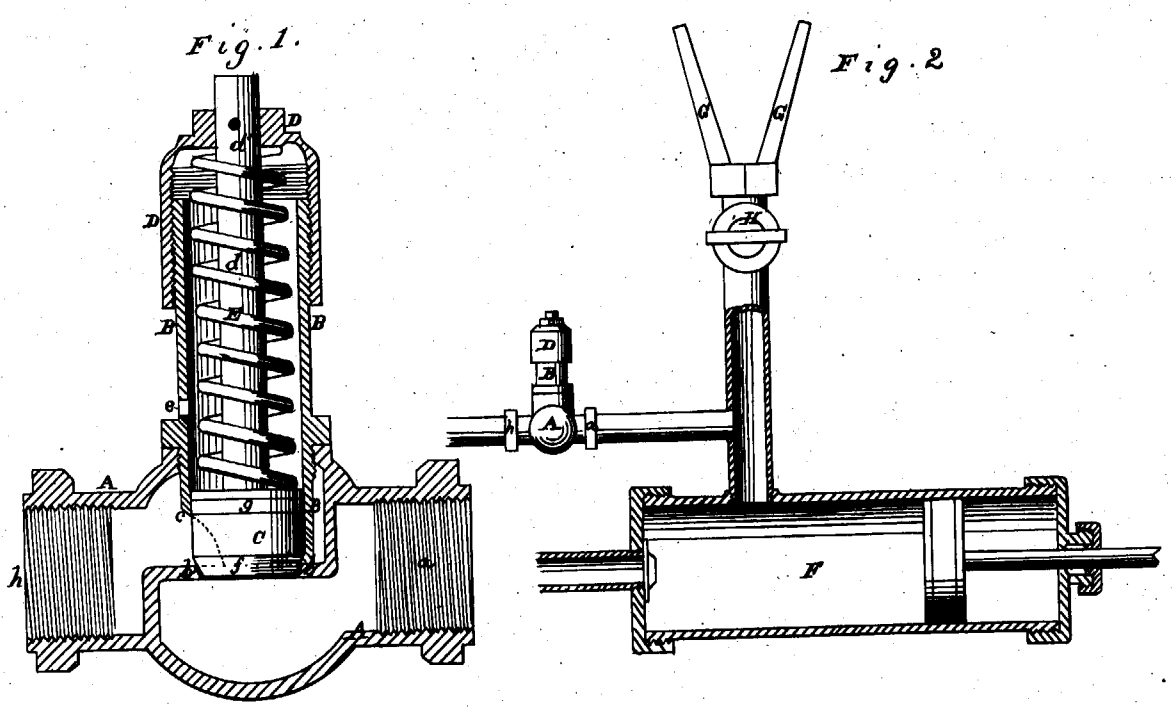
Witnesses
Geo H Strong
Jno L. Boone
Inventor
Charles E. Blake
Assignee of Thos H. Bailey Dec'd
by Dewey & Co.
Attys.

UNITED STATES PATENT OFFICE.

CHARLES E. BLAKE, OF SAN FRANCISCO, CAL., ASSIGNEE OF BRIDGET WALLACE, ADMINISTRATRIX OF THOMAS H. BAILEY, DECEASED.

IMPROVEMENT IN RELIEF-VALVES FOR WATER-CYLINDERS.

Specification forming part of Letters Patent No. 41,471, dated February 9, 1864; Reissue No. 7,886, dated September 18, 1877; application filed May 11, 1877.

*To all whom it may concern:*

Be it known that THOMAS H. BAILEY, deceased, did invent a new and Improved Valve for Water-Cylinders of Steam Fire-Engines and other Pump-Cylinders, of which the following is a full and complete description:

Previous to this invention the only valve employed for relieving the pressure upon fire-hose to prevent it from bursting in case the water-passage through the hose should become obstructed, or in case of excessive pressure from the engine, was one operated by hand. This valve, however, was ineffectual unless the engineer, or other person whose duty it was to open and close the valve, had previous notice that the pressure was increasing or had increased, and as these emergencies are always liable to occur instantaneously without previous notice, the hose would often be bursted before the relief-valve was operated; and, besides this, the excitement which always prevails at a fire renders a strict attention to this valve almost impossible.

THOMAS H. BAILEY, however, remedied all these difficulties by applying a valve at some point between the engine or pump and hose-nozzle that is automatic in its action—that is, it is opened by any excess of pressure in the hose or pump-cylinder, so as to discharge an additional stream, and thereby relieve the inside pressure correspondingly. The valve is kept upon its seat by a spring, and it will therefore resist a pressure corresponding to the power of the spring, so that ordinarily it remains closed; but in case the pressure in the hose should be increased by any means so as to overcome the tension of the spring, and threaten to burst the hose, the spring will yield, and allow the valve to open and relieve the pressure.

Referring to the accompanying drawings, Figure 1 is a central vertical sectional view of the valve. Fig. 2 is a central vertical sectional view, on a smaller scale, showing the attachments of the valve to a pump-cylinder.

A is a casing, like that of an ordinary globe-valve, attached, by a screw-thread, *a*, to a suitable opening provided in the pump-cylinder F, between the said cylinder and the hose or pipe connections. B is a hollow cylinder, screwed into the top of the said casing, and coming to a bearing on the top of the casing, and into contact with a surface surrounding the valve-seat *b*, but having an opening, *c*, at the bottom, toward the outlet-opening of the casing. C is the valve, having a conical face, *f*, ground to fit the seat *b*, and having its upper part made in the form of a piston, and packed with leather or other soft material, *g*, to fit water-tight within the cylinder B. This valve has a stem, *d*, which fits to an opening in an adjustable screw-cap, D, which is screwed onto the top of the cylinder B. E is a spiral spring surrounding the valve-stem, between the top of the valve and the crown of the screw-cap D, and adjusted by screwing down the said cap to make it produce a greater or less pressure upon the upper side of the valve, so that a greater or less pressure may be required upon its under side to open it. *e* is a vent-hole in the cylinder B, above the valve, to provide for the escape from the said cylinder of any water that may pass above the valve. G G, Fig. 2, are two hose or pipe connections, one of which may be closed by the single cock H, leaving the other open. Separate cocks may be used for the two pipe connections.

The spring E is intended to be so adjusted that when the hose or pipe connections are both or all open it will exert pressure enough upon the valve to keep it closed, but that, when one or both of the said connections are closed, the extra pressure upon the pump and hose or pipe, acting upon the lower surface of the valve, may raise it, and provide for a suitable escape of water through the outlet *h* of the casing A, and so relieve the pump and hose or pipes.

The construction of the upper part of the valve to fit the cylinder B like a piston is intended to prevent any accumulation of water within the said cylinder above the valve which would interfere with the free opening of the valve; and in case of any water passing the piston by reason of defective packing, it will escape by the vent *e*.

To enable the valve to be screwed down to bring all practical pressure upon the pump and hose in a trial of an engine, there is a hole, *d'*, drilled through the upper part of the screw-cap D and valve-stem *d* when the valve is down in its seat for the reception of a pin, by the insertion of which the valve-stem and cap can be connected rigidly, so that by slightly turning the cap the valve may be screwed down close to its seat.

A spring-valve can be variously applied to different parts of a pump or hose for the same purpose; but the above description is sufficient to illustrate the essential features.

Having thus described the invention of the said THOMAS H. BAILEY, deceased, what I claim, and desire to secure by Letters Patent as sole assignee of said patent, is—

1. The combination, with a pump-cylinder and hose of a fire-engine, of an automatic relief-valve, arranged relatively thereto, substantially as specified.

2. The combination of the valve C, stem $d'$, spring E, adjustable cap D, and pin-hole $d$, whereby the valve may be either held upon its seat with a variable yielding pressure, or may be elevated therefrom, or held immovably thereon as an ordinary screw-plug.

CHAS. E. BLAKE, *Assignee.*

Witnesses:
O. T. STACY,
F. A. BROOKS.